Sept. 17, 1968   L. R. WESTBY ET AL   3,401,566
SENSING CONTROL DEVICE
Filed May 3, 1967   5 Sheets-Sheet 1
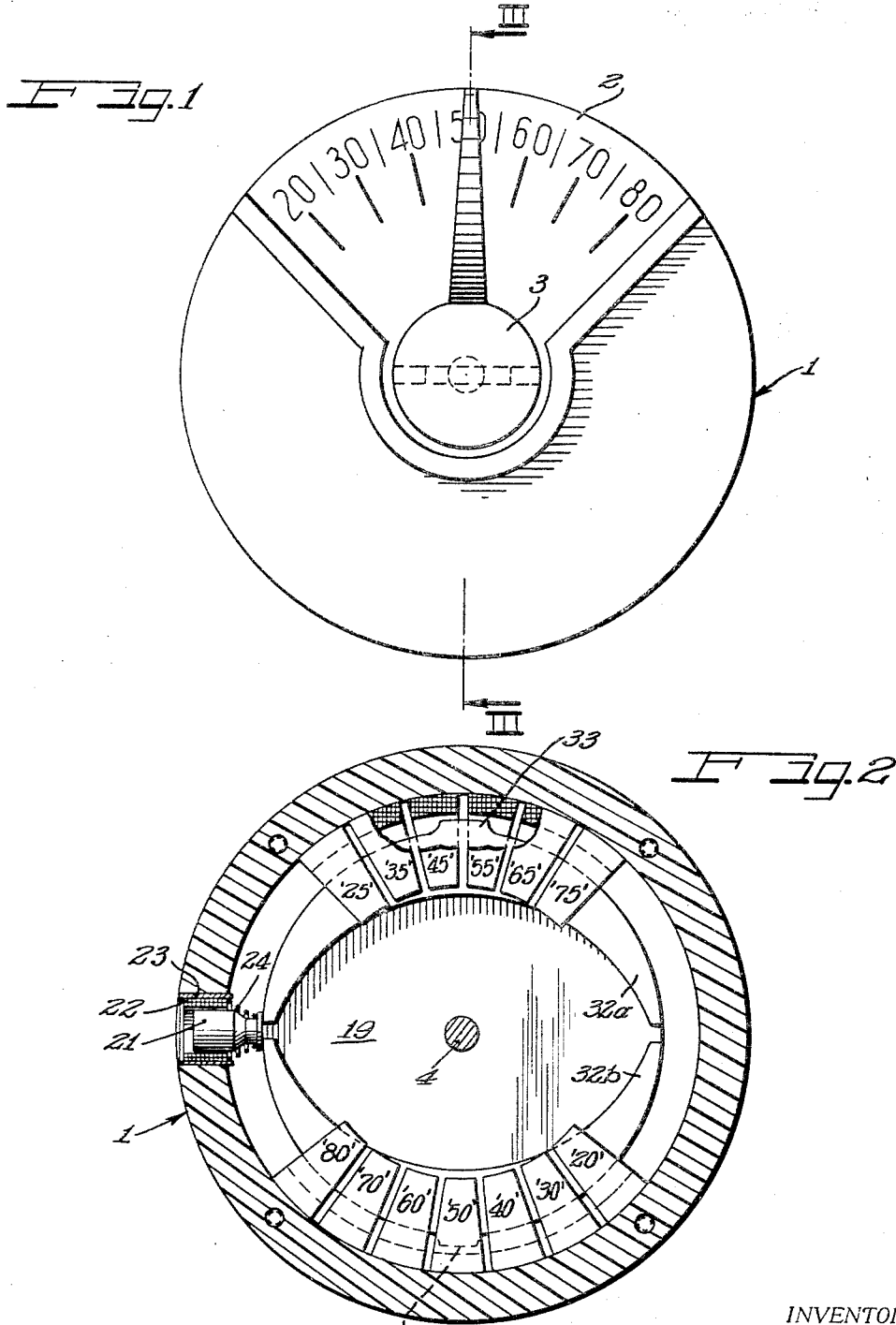
INVENTORS
Lloyd R. Westby
Francis H. Bourgeois
Stice & Stice  ATTORNEYS Sept. 17, 1968   L. R. WESTBY ETAL   3,401,566
SENSING CONTROL DEVICE
Filed May 3, 1967   5 Sheets-Sheet 2

INVENTORS
Lloyd R. Westby
Francis H. Bourgeois
Lee & Lee ATTORNEYS

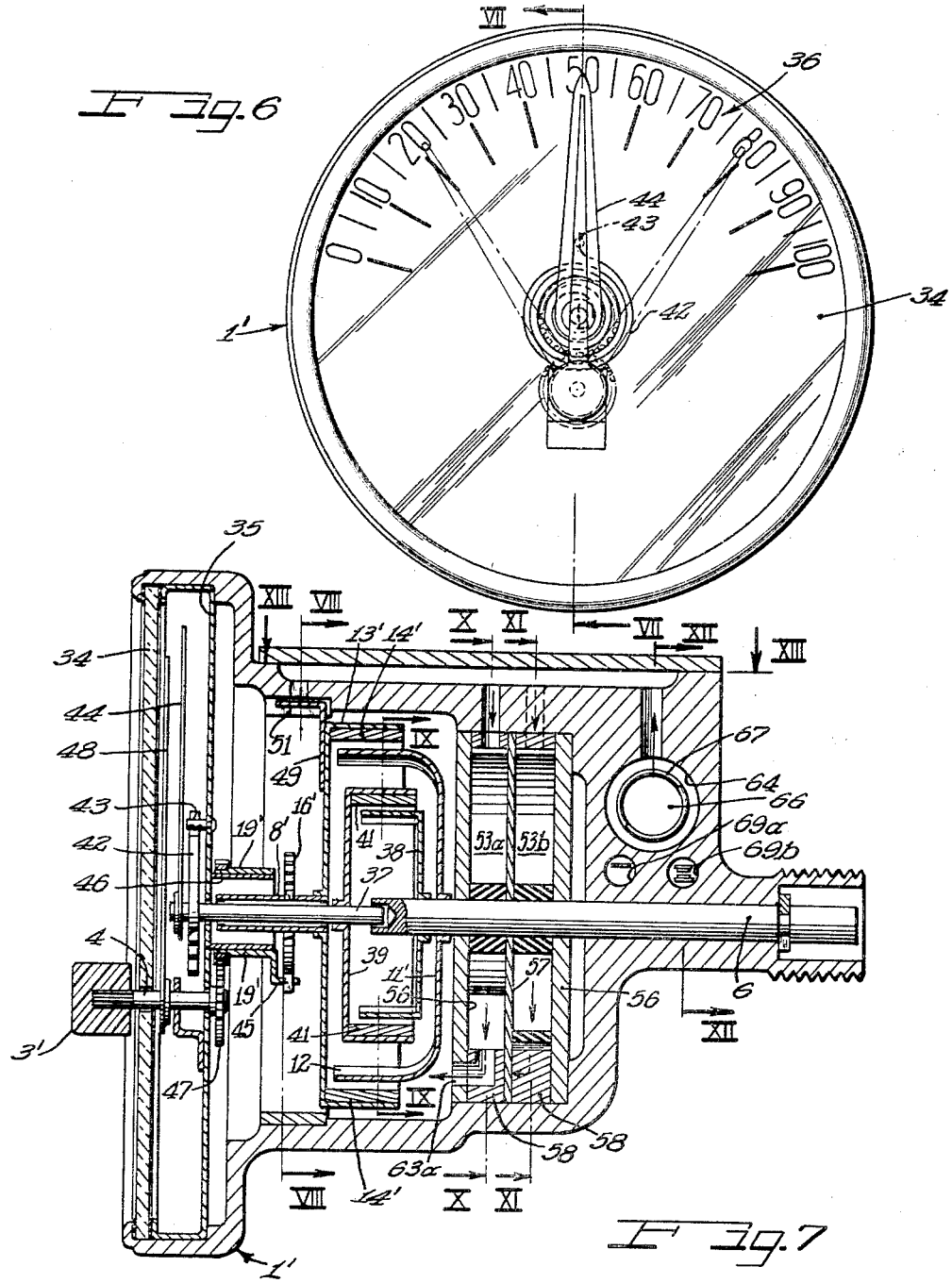

Sept. 17, 1968 L. R. WESTBY ET AL 3,401,566
SENSING CONTROL DEVICE
Filed May 3, 1967 5 Sheets-Sheet 4
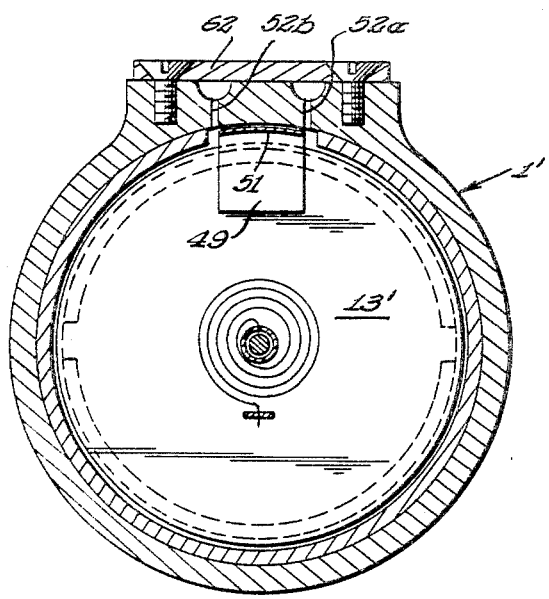
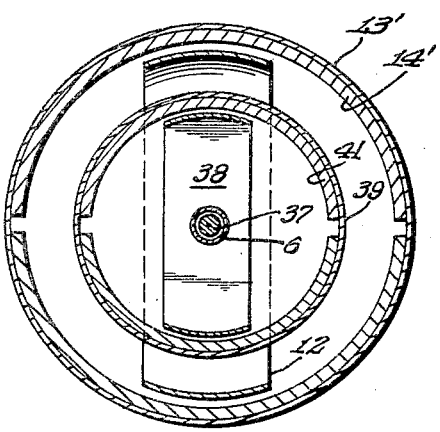
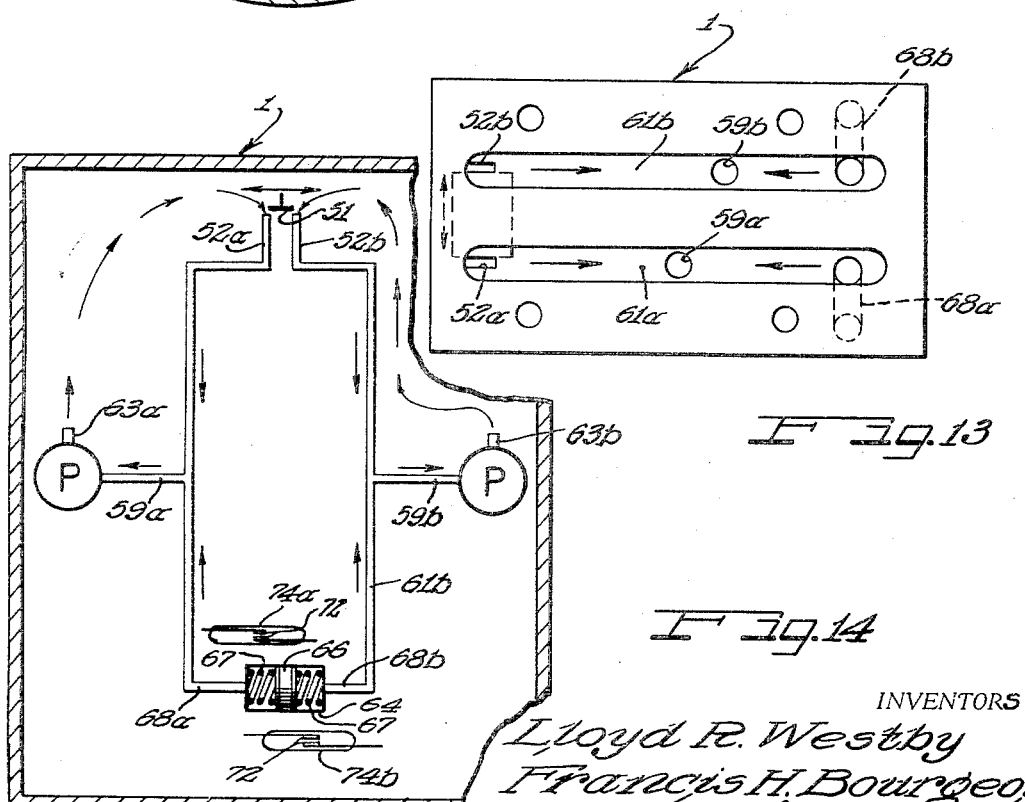
INVENTORS
Lloyd R. Westby
Francis H. Bourgeois
BY   ATTORNEYS Sept. 17, 1968          L. R. WESTBY ET AL          3,401,566
SENSING CONTROL DEVICE
Filed May 3, 1967          5 Sheets-Sheet 5
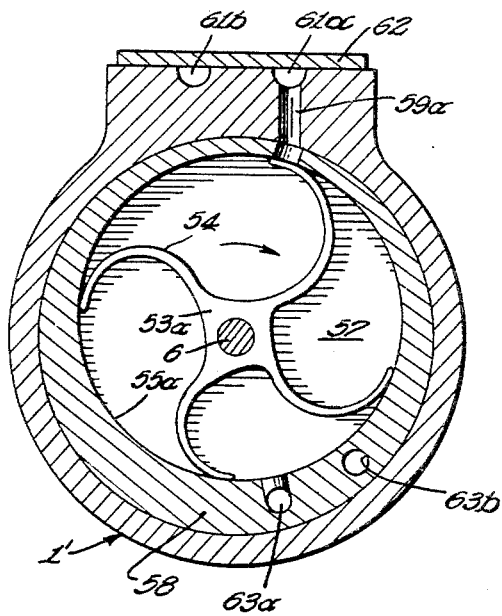
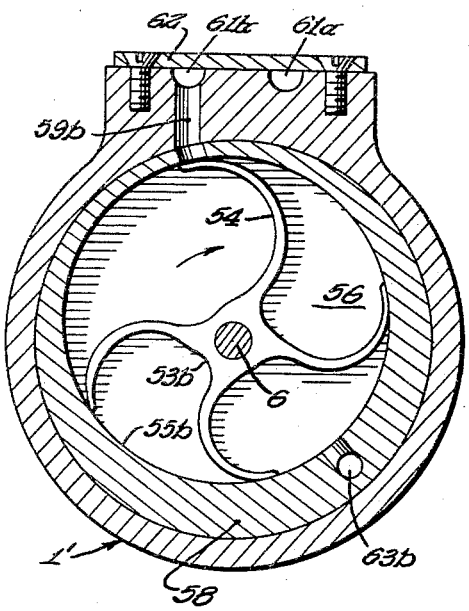
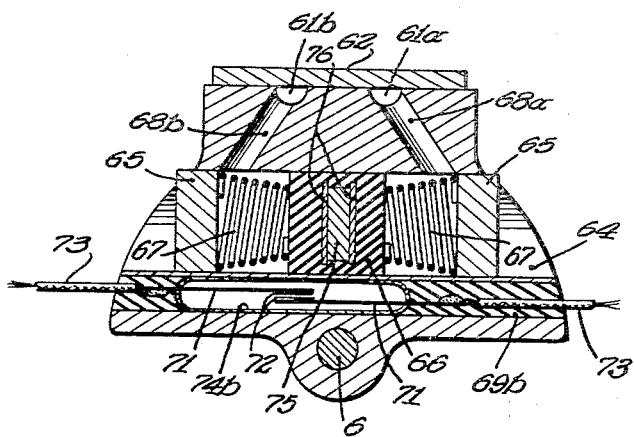
INVENTORS
Lloyd R. Westby
Francis H. Bourgeois
BY      Shee & Shee ATTORNEYS United States Patent Office 3,401,566
Patented Sept. 17, 1968

3,401,566
SENSING CONTROL DEVICE
Lloyd R. Westby, P.O. Box 233, Wayne, Ill. 60184, and Francis H. Bourgeois, P.O. Box 84, Oak Park, Ill. 60305
Filed May 3, 1967, Ser. No. 635,381
11 Claims. (Cl. 73—518)

ABSTRACT OF THE DISCLOSURE

A sensing device for rotating elements, having a spring biased magnetically coupled driven element which is positionally responsive to the r.p.m. of a rotating driving element, the driven element being operatively connected with switch means, directly or indirectly actuatable thereby, including by pneumatic means, with the spring biasing means being selectively adjustable, for example, by manual or electromagnetic operation. Where used as a vehicle speed sensing device, it may be incorporated as a part of the speedometer.

---

The invention relates to a sensing device constructed to effect an electrical control function in response to the criteria sensed, and is particularly adapted for use in connection with an r.p.m. or speed sensing or controlling system, as for example, a vehicle speed control system.

The invention is of particular application in connection with electrical circuits which are to be responsive to changes taking place in the operation of a rotating element, as for example, to provide corrective action in response to deviation from a set operation. For the purposes of explanation, the invention will be explained in connection with its application as a speed sensing device for a vehicle or the like wherein it is responsive to changes above or below a preset speed adjustment, and operative to close respective switches in dependence upon variation above or below the desired setting.

The invention has among its objects the production of a sensing device which is extremely simple, inexpensive to manufacture and foolproof in operation.

A further object of the invention is the production of such a sensing device which may be easily and readily adjusted, manually or otherwise, to a selected setting, and which by relatively very simple means, may be constructed for electrical adjustment, as for example, by radio or other similar means.

A further object of the invention is the production of such a sensing device which has a minimum of moving parts and a minimum of inertia, resulting in an extremely sensitive device which will provide responsive control with a very small operating differential, and which may be varied as to its adjustment or setting at any time during operation.

Many other objects and advantages of the construction herein shown and described will be obvious to those skilled in the art from the disclosure herein given.

In the drawings, wherein like reference characters indicate like or corresponding parts:

FIG. 1 is a front plan view of a sensing device embodying the invention, for example, for use in connection with a vehicle speed control or the like;

FIG. 2 is a sectional view of the device illustrated in FIG. 1, taken aproximately on the line II—II of FIG. 3;

FIG. 6 is a front plan view similar to FIG. 1, illustrating a modified form of the invention wherein pneumatic means is employed for actuating switch means in response to the sensing operation;

FIG. 7 is a longitudinal section taken approximately on the line VII—VII of FIG. 6;

FIG. 8 is a transverse section taken approximately on the line VIII—VIII of FIG. 7;

FIG. 9 is a sectional view taken approximately on the line IX—IX of FIG. 7;

FIG. 10 is a sectional view taken approximately on the line X—X of FIG. 7;

FIG. 11 is a sectional view taken approximately on the line XI—XI of FIG. 7;

FIG. 12 is a sectional view taken approximately on the line XII—XII of FIG. 7;

FIG. 13 is a top plan view of the top portion of the housing with the cooperable cover plate removed and taken approximately on the line XIII—XIII of FIG. 7; and FIG. 14 is a schematic diagram of the vacuum system involved in the construction illustrated in FIGS. 6 through 13.

The embodiments of the invention illustrated utilize magnetic coupling means for transmitting the rotary action of a drive shaft or the like into a positionally dependent driven member, biased by suitable spring means which is selectively adjustable, whereby the position of the driven member is dependent upon the amount of bias supplied by the spring and the rotative speed of the driving member.

Suitably operatively connected with the driven member are respective switch means which are operable in response to predetermined changes in the position of the driven member and by means of which indicating devices, control devices, etc., may be connected. The adjustment of the spring bias may be suitably effected, manually or through other means, one example being illustrated, involving electromagnetic means.

Figure 3:
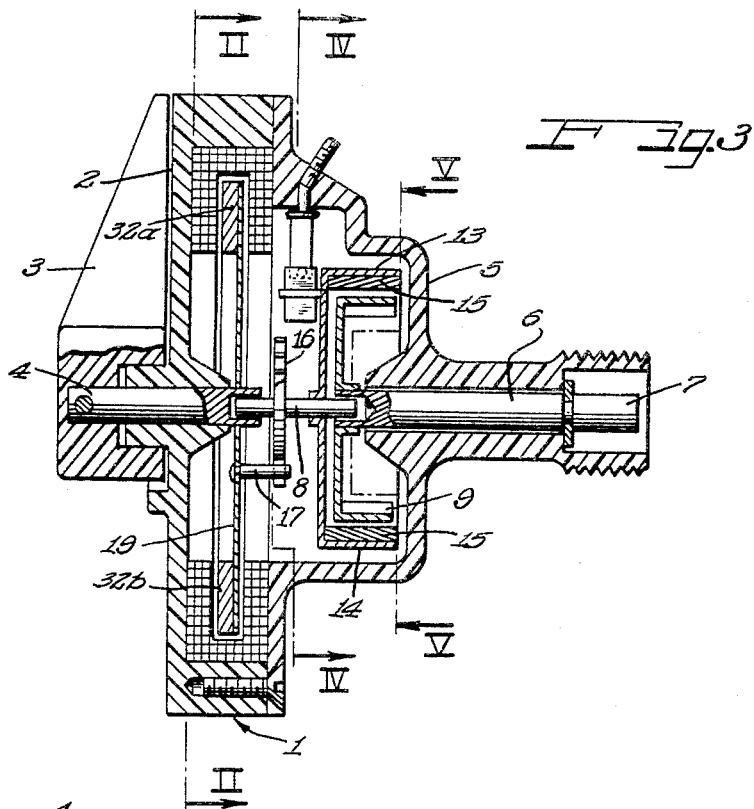
FIG. 3 is a sectional view taken approximately on the line III—III of FIG. 1.

Referring to the drawings, and more particularly to FIGS. 1–5, the reference numeral 1 indicates generally a housing structure having a front face provided with a scale 2, illustrated as representing miles per hour, and extending from the housing 1 is a manually adjustably actuating knob 3. As illustrated in FIG. 3, the knob 3 is mounted on an actuating or adjusting shaft 4 which is suitably supported by and freely rotatable in the housing 1. Also freely rotatably supported in the base portion 5 of the housing is a drive shaft 6 which is suitably constructed at its free end 7 for connection with rotatable means for driving the device, as for example, a speedometer shaft. The shafts 4 and 6 are axially aligned in spaced relation and their opposed ends are provided with respective aligned bores forming pilot bearings in which is rotatably supported an output shaft 8.

Rigidly supported on the inner end of the shaft 6 and rotatable therewith is a ferromagnetic armature 9 which is of generally C-shape in cross section, having a flat radially extending portion 11 and two arcuate-shaped transversely extending arms 12. The armature 9 forms a driving element which is cooperable with a generally cup-shaped driven element 13, rigidly secured to the shaft 8 and provided with a peripheral flange portion 14, extending concentric with respect to the arcuate portions 12 of the driving element. Disposed adjacent the inner face of the flange 14 and rigidly secured thereto are two semicircular permanent magnets 15. Thus, upon rotation of the armature 9, the magnetic attraction between the arms 12 of the armature and the magnets 15 results in a coupling force whereby the member 13 seeks to rotate with the armature. Such rotative movement of the member 13 is countered by the action of a spiral torsion spring 16, the inner end of which is rigidly attached to the output shaft 8. The opposite or outer end of the spring 16 is anchored to a pin 17 rigidly carried by and extending transversely to a circular disk 19 rigidly mounted on the actuating or adjustment shaft 4.

As illustrated in FIG. 2, supported in the housing 1 and extending radially inward is a brake member 21, illustrated as being in the form of a solenoid plunger which is partially disposed within a solenoid winding 22 carried by a sleeve 23 mounted in the housing 1. The plunger 21 is urged in a radially inward direction by a compression spring 24 which bears on the inner head of the plunger 21, thereby biasing it in such inward direction, whereby the plunger normally engages the outer edge of the disk 19 and frictionally bears thereupon to prevent undesired rotative movement of the disk. Upon energization of the winding 22 the plunger 21 is retracted into the solenoid winding, in opposition to the spring 24, thereby releasing the disk 19.

The construction thus far described provides a complete operative structure which may be manually adjusted, and insofar as such manually adjustment is concerned, the solenoid winding may be disregarded as the disk 19 may be readily adjusted by means of the knob 3 upon application of sufficient force to overcome the braking action of the plunger 21, the latter, however, being operative to effectively retain the disk 19 in any of its adjusted positions.

Figure 4:
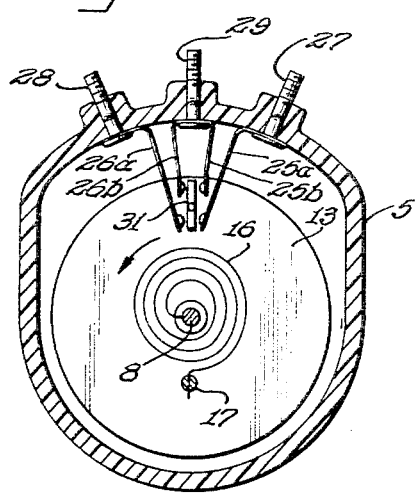
FIG. 4 is a sectional view taken approximately on the line IV—IV of FIG. 3.
Figure 5:
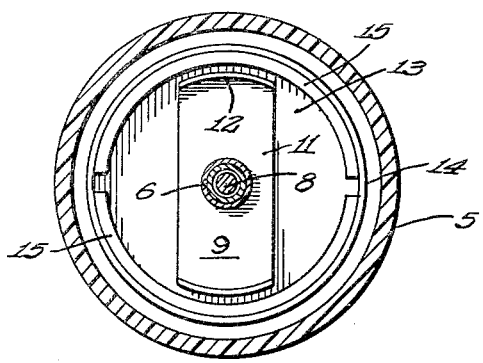
FIG. 5 is a sectional view taken approximately on the line V—V of FIG. 3.

Referring to FIGS. 3 and 4, extending inwardly from the housing, which in the embodiment illustrated is suitably constructed of plastic or other insulating material, are two pairs of resilient contact leaves 25a, 25b and 26a, 26b, with the contacts 25a and 26a being connected to respective terminals 27 and 28 and the contacts 25b and 26b being connected to a common terminal 29. Cooperable with the respective pairs of contacts is a contact plate 31 which is suitably supported on the member 13, for movement therewith about the shaft 8, and adapted to assume a central position as illustrated in FIG. 4 in which neither pair of contacts is closed, or either of two extreme positions in each of which a respective pair of contacts 25 or 26 will be closed, thus enabling suitable actuation of a responsive circuit connected to the terminals 27 and 28 and 29.

The structure thus far described provides a complete operating device with manual adjustment, the operation of which is as follows: Assuming, for example, that the drive or input shaft 6 is operatively connected to rotating means such as the speedometer cable of a vehicle, the shaft 6 will be rotating at a speed which is proportional to the speed of the vehicle. Likewise, assuming that the knob 3 is in the position illustrated in FIG. 1, the spring 16 will be tensioned to approximately the mid-point of its two extremes represented by the extreme end positions of the knob 3 on the scale 2. It is assumed that the scale 2 is so calibrated that in the position illustrated in FIG. 1, of the knob 3, the spring 16 will just balance the coupling forces between the armatures 9 and members 13 whereby the latter will assume a position as illustrated in FIG. 4, with the contact plate 31 being disposed between the respective pairs of contacts in a neutral position, whereby both circuits 27-29 and 28-29 are open. Assuming that the speed of the shaft 6 decreases, the coupling forces exerted on the member 13 will decrease, permitting the spring 16 to rotate the member 13 in a direction to bring the plate 31 into engagement with the corresponding pair of contacts. Thus, for example, assuming that the shaft 6 is rotating in a counterclockwise direction as illustrated in FIG. 4, upon a slowing down of the shaft the member 13 will move clockwise into a position wherein the plate 31 bridges the contacts 25a and 25b, closing any circuit connected to the terminals 27 and 29. In like manner, if the speed of the shaft 6 should increase, the member 13 will be rotated in a counterclockwise direction by the increase in the coupling forces, resulting in a bridging of the contacts 26a and 26b and the closing of a circuit connected to the terminals 28 and 29.

Thus, by connecting the terminals 27-29 in a corrective mechanism for increasing the speed of the shaft and the terminals 28-29 in a circuit of a correcting mechanism for reducing the speed of the shaft 6, an effective maintenance of a constant speed of the shaft 6 may be achieved.

The mechanism thus far described readily adapts itself to a remote control, as for example, by electromagnetic means and suitable electrical circuits, whereby the disk 19 may be selectively adjusted without manual actuation of the knob 3. The mechanism for accomplishing these results comprises a pair of crescent-shaped ferromagnetic armatures 32a and 32b rigidly carried by the disk 19 and cooperable with a plurality of U-shaped electromagnets 20, 25, 30, etc., which for the purposes of explanation will be assumed to correspond to like speed settings as appear on the scale 2. Each of the crescent-shaped armatures is provided with a central enlargement or projection 33 so that upon actuation of any one of the electromagnets the associated armature will tend to move into a position wherein the central projection 33 is disposed between the legs of such electromagnet, assuming that the disk 19 is not restricted by the brake plunger 21. Obviously, due to the configuration of the respective armatures, the latter will tend to draw into the desired position regardless of its initial position when the selected electromagnet was actuated.

To actuate the structure by remote control, the winding 22 is energized to release the disk 19 and at the same time the selected electromagnet is energized to rotate the disk 19 into the selected position, following which the winding 22 may be deenergized to return the plunger 21 into engagement with the disk 19 and thereby retain the same in its selected position. Obviously, this type of actuation may be readily effected by any one of numerous types of circuits, including radio-controlled arrangements.

The construction illustrated in FIGS. 6 through 13 is generally similar in its general arrangement and broad operation to that previously described, but employs a pneumatic system for actuating the controlling switches, thereby divorcing the sensing unit from the switch actuating mechanism and eliminating any direct connection or inertia between the sensing member and the switches. This construction also illustrates the incorporation of the present invention in a speedometer mechanism having its own indicating needle, etc.

Referring to FIGS. 6 and 7, the reference numeral 1' designates the housing of the structure, which in this embodiment is provided with a transparent face 34 through which is visible a dial plate 35 provided with a speedometer scale indicated generally by the numeral 36. The input or drive shaft 6 is suitably supported in the housing 1' and is provided at its inner end with a bore which forms a pilot bearing for a speedometer shaft 37, the other end of which is suitably journaled in the plate 35. The shafts 6 and 37 are operatively connected by a magnetic coupling structure similar to the members 11-13 of the construction of FIGS. 1-5, comprising a driving armature 38 rigidly carried by the shaft 6 and cooperable, driven member 39, rigidly carried by the shaft 37, with the driven member being provided with cooperable permanent magnets 41. The shaft 37 is suitably biased by a spiral torsion spring 42, the inner end of which is secured to the shaft 37, and the outer end of which is anchored to the dial plate 35 by a suitable transversely extending stud 43. Also rigidly carried by the shaft 37 is a speedometer needle 44. Thus as the shaft 6 is rotated, the speedometer needle 44 will be moved in accordance with the rate of rotation of the shaft 6 and thus the speed of the vehicle.

Also rigidly carried by the input shaft 6 is an armature

11', constructed in a manner similar to that previously described and a cooperable driven member 13' having magnets 14'. In this construction the member 13' is rigidly mounted on a tubular output shaft or sleeve 8' which is freely rotatably supported on the shaft 37 and is counterbalanced by a spiral torsion spring 16', the inner end of which is secured to the shaft 8' and the outer end of which is secured to a radially extending projection 45, carried by a cylindrical sleeve 19' rotatably supported on a tubular bearing member 46 which is rigidly carried by the dial plate 35. The tubular sleeve 19' is adapted to be pivotally adjusted by means of a knob 3' mounted on a shaft 4 suitably supported by the dial plate 35 and provided at its inner end with a disk 47 having teeth cut therein adapted to mesh with cooperable teeth carried by the sleeve 19', whereby rotative movement of the shaft 4 is transmitted to the sleeve 19', thus increasing or relieving the tension of the spring 16'. Visual indication of the adjustment of the shaft 4 and thus of the spring 16' is provided in the form of an indicating needle 48 which is rigidly carried by the shaft 4. The shaft 4 thus has a rotation of approximately slightly over 60 degrees from the two extreme positions illustrated in broken lines in FIG. 6. The total movement of the shaft 4 and needle 48 may be readily determined by the number of cooperable teeth on the disk 47 and the sleeve 19', thereby providing automatic stops for limiting the pivotal movement of the shaft 4.

Referring to FIGS. 7 and 8, the member 13' is provided with a radially extending arm 49 terminating at its outer end in an arcuate-shaped projection or tab 51 which is concentric with the axis of the shaft 8' and, as illustrated in FIG. 8, is adapted to be normally disposed between two air inlet ports 52a and 52b which represents the neutral position of the member 13'. As hereinafter discussed in detail, in the event the member 13' is pivotally moved as a result of the increase or decrease of the speed of the shaft 6, the projection 51 will cover one or the other of the air ports 52, resulting in actuation of the corresponding switch means associated therewith.

The pneumatic actuating means for translating the position of the member 13' and projection 51 into contact actuating forces is illustrated in FIGS. 7 and 10 to 14.

As illustrated in FIGS. 7 and 10 and 11, also rigidly mounted on the input shaft 6 a pair of rotors 53a and 53b which may be constructed of flexible material such as a synthetic rubber, plastic or other suitable material and provided with a plurality of vanes 54 disposed in respective chambers 55a and 55b which are eccentrically disposed with respect to the axis of the shaft 6. In the embodiment of the invention illustrated the chambers 55a and 55b are formed by an assembly of end plates 56, intermediate plate 57 and two spacer rings 58 in which are eccentrically disposed respective bores defining the peripheries of the chambers 55a and 55b. The respective chambers are provided with air inlet ports 59a and 59b which are connected with corresponding inlet ports 52a and 52b by horizontally extending channels formed by grooves 61a and 61b in the upper surface of the housing 1 and closed by a cover plate 62, suitable gasket means being interposed therebetween if desired, with the cover plates being secured by screws or other means to the housing. Each chamber is also provided with an air outlet port 63a or 63b, air thus being drawn through the ports 52a, 52b into the respective rotor chambers and discharged through the inlet ports 63a, 63b.

The housing 1' is also provided with a transversely extending bore 64 closed at its ends by plugs 65 and containing a piston 66 therein which is biased in a neutral central position, as illustrated in FIG. 12, by oppositely disposed compression springs 67, with the chambers at opposite sides of the piston 66 communicating with the respective channels 61a and 61b by means of converging passageways 68a and 68b.

The housing 1' is also provided with two additional bores 69a and 69b which are smaller in diameter than the bore 64 and extend parallel thereto. Disposed in each of the bores 69 is a reed-type contact switch which may be of the enclosed or sealed type and comprises a pair of reeds 71, the inner ends of which overlap and are provided with contact points 72. The outer ends of the respective reeds are operatively connected with lead wires 73, the overlapping inner ends of the reeds being sealed in a glass or other suitable receptacle 74. As illustrated in FIG. 12, the contact set disposed in the bore 69b is axially offset with respect to the axis of the shaft 6, to the left as viewed in FIG. 12, and the corresponding contacts disposed in the bore 69a are similarly disposed but at the opposite side of the shaft 6. Actuation of the contacts is effected by means of a permanent magnet 75 which, with pole pieces 76, is imbedded in the piston 66. Thus, when the piston is in its neutral position as illustrated in FIG. 12 neither pair of contacts is closed, but when the piston 66 is moved to the left as viewed in FIG. 12 the contacts disposed in the bore 69b will be closed by the magnetic attraction while movement of the piston to the right will effect closure of the contacts in the bore 69a.

The operation of this embodiment of the invention is as follows: Assuming the device is connected to the speedometer shaft of a vehicle, upon rotation of the shaft 6 in a clockwise direction as viewed in FIG. 6, rotation of the armature 38 will cause partial rotation of the driven member 39 and shaft 37, thereby moving the speedometer needle 44 to the represented speed, for example, 50 m.p.h. as illustrated in FIG. 6. At the same time, assuming that the knob 3' has been rotated to bring the indicating needle 48 at the desired speed, 50 m.p.h. as illustrated in FIG. 6, the tension on the spring 16' would be such that the torque exerted by the armature 11' on the member 13' would be exactly counter-balanced by the torsion spring and the member 13' would thus assume the position illustrated in FIG. 8, with the flap or projection 51 centered between the ports 52a and 52b.

Simultaneously with this operation, the shaft 6 is rotating the rotors 53a and 53b in their eccentrically disposed chambers 55a, 55b, resulting in a flow of air through the ports 52, channels 61 and 59 into the chambers 55, the air being subsequently discharged through the discharge ports 63. As the chambers at the opposite sides of the piston 66 communicate with the respective channels 61, the air pressure therein will correspond to that in the intake ports 59 to the chambers 55 and as the air pressure in both channels is uniform, no pressure differential exists on opposite sides of the piston 66. However, if the shaft 6 should slow down, the member 13' would rotate slightly in a counterclockwise direction as viewed in FIG. 8, resulting in the flap 51 overlying the mouth of the port 52b, thereby restricting the flow of air into the port and thus into the corresponding rotor-chamber 55b, a vacuum is thereby developed in the channel 61b which is also reflected in the chamber at the left side of the piston 66 as viewed in FIG. 12. However, as no change has taken place in the pressure at the opposite side of the piston, a differential is produced, resulting in movement of the piston to the left as viewed in FIG. 12 to close the contact 72. In like manner if the speed of the shaft 6 increased, the flap 51 will close the inlet port 52a, resulting in a reversal of the pressure differential and closure of the contact associated with the bore 69a.

The general operation of the pneumatic system is illustrated in FIG. 14, from which it will be apparent that the interior of the housing 1 forms a closed system wherein air flows through the ports 52, through the pumps 59 and is discharged through the ports 63, until a shifting of the flap valve 51' takes place to alter the existing balanced condition, resulting in a pressure differential at one side of the piston 66, whereby actuation of the corresponding switch takes place.

It will be apparent from the above description that we have provided a novel sensing device which involves a minimum of inertia in the sensing element to provide a high degree of sensitivity and at the same time such objective is achieved in a relatively simple and inexpensive arrangement.

It will also be apparent that while we have referred to the invention in connection with a vehicle speed application, the same is merely illustrative and the invention may be employed in any application requiring a sensitive sensing structure by means of which electrical or other means is to be controlled or affected.

Having thus described our invention, it is obvious that various immaterial modifications may be made in the same without departing from the spirit of the invention; hence we do not wish to be understood as limiting ourselves to the exact form, construction, arrangement and combination of parts herein shown and described, or uses mentioned.

We claim:

1. A sensing device for rotating members comprising a rotatable driving member, a pivotally movable driven member operatively coupled to and positionally responsive to rotation of said driving member, said driven member having a neutral intermediate position and respective extreme positions at each side of and closely adjacent to said intermediate position, said driven member being movable between said two extreme position, spring means resiliently opposing movement of said driven member, responsive to the action of said driving member, means operatively connected to said spring means for selectively varying the opposing force of said spring on said driven member, and switch means arranged for predetermined operative actuation in response to the positioning of said driven member in either of said extreme positions, and non-actuated when said driven member is in said intermediate position, by means of which sensing changes in either direction from said intermediate position are reflected in action of corresponding switch means.

2. A sensing device as defined in claim 1, wherein said driving member is magnetically coupled to said driven member, said spring means comprising a spiral torsional spring having one end connected to said driven member, said spring varying means comprising a pivotally movable member to which the other end of said spring is anchored.

3. A sensing device according to claim 2, wherein said means, positionally responsive to the movement of said driven member, comprises means carried by said driven member cooperable with two adjacent air inlet ports, communicating with pump means operative to draw air through such inlet port, for operatively selectively restricting the flow of air entering one or the other of said ports, and means operatively connected to the respective air inlet ports responsive to pressure differentials resulting from the action of said port restricting means to effect selective actuation of said contacts.

4. A sensing device according to claim 3, wherein said pump means comprises a pair of flexible pump rotors rotatable with said driving member, positioned in respective pump chambers concentrically disposed with respect to the axis of said driving member, each of said ports forming the air intake for a respective pump chamber, and pressure differential responsive means comprising a cylinder bore in which is disposed a freely movable piston, the portions of said cylinder bore at opposite sides of said piston communicating with respective air inlet ports, spring means normally biasing said piston in a central neutral position, and means carried by said piston, cooperable with said switch contacts for selectively actuating the latter in accordance with the movement of said piston.

5. A sensing device according to claim 4, wherein said means carried by said piston comprises a permanent magnet, said switch contacts comprising magnetically actuatable reed-type field contacts, one set of which is disposed for actuation when said piston moves in one direction from its neutral position, and another contact set being disposed for actuation when said piston is moved in opposite direction from its central neutral position.

6. A sensing device according to claim 1, wherein said means responsive to the position of said driven member comprises a contact element movable with said driven member and engageable with respective cooperable contacts, and manually actuatable means for effecting adjustment of said spring varying means.

7. A sensing device according to claim 1, wherein said driving member is mounted on the drive shaft of a speedometer mechanism, said driving and driven members being concentrically disposed with respect to means operatively connecting said drive shaft to such speedometer mechanism.

8. A sensing device for rotating members comprising a rotatable driving member, a pivotally movable driven member magnetically coupled to and positionally responsive to rotation of said driving member, spring means resiliently opposing movement of said driven member, means operatively connected to and spring means for selectively varying the opposing force of said spring on said driven member comprising a pivotally movable member to which said spring is operatively anchored, means responsive to movement of said driven member, including switch contacts, by means of which sensing changes are reflected in actuation of such contacts, armature means mounted on and movable with said spring varying pivotal member, and electromagnetic means cooperable with said armature for effecting movement of said pivotal member to a predetermined position.

9. A sensing device according to claim 8, wherein said armature is crescent-shaped, providing an enlarged central portion, said electromagnetic means comprising a plurality of individually energizable electromagnets whereby the position of said pivotal member may be determined by energization of a selected electromagnet.

10. A sensing device according to claim 9, wherein there are provided two crescent-shaped armatures and a plurality of electromagnets for each armature, the electromagnets cooperable with one armature being disposed to selectively position the pivotal member at respective positions disposed intermediate positions effected by the electromagnets cooperable with the other armature.

11. A sensing device according to claim 9, comprising in further combination electromagnetically controlled means engageable with said pivotal member operative to retain the latter in adjusted position and releasable therefrom to permit adjustment of such member.

References Cited

UNITED STATES PATENTS

| | | | |
|---|---|---|---|
| 2,880,288 | 3/1959 | Rosenberg | 200—56 XR |
| 2,920,154 | 1/1960 | Allen | 340—263 XR |
| 2,992,419 | 7/1961 | Hayes | 200—56 XR |

RICHARD C. QUEISSER, *Primary Examiner.*

JOHN R. FLANAGAN, *Assistant Examiner.*